US012092832B2

(12) United States Patent
Yeh et al.

(10) Patent No.: US 12,092,832 B2
(45) Date of Patent: Sep. 17, 2024

(54) DEVICE FOR ADJUSTING DEGREE OF TIGHTNESS AND HEAD-MOUNTED DISPLAY INCLUDING THE SAME

(71) Applicant: Quanta Computer Inc., Taoyuan (TW)

(72) Inventors: Chun-Feng Yeh, Taoyuan (TW); Chun-Lung Chen, Taoyuan (TW); Chun-Nan Huang, Taoyuan (TW); Bing-Kai Huang, Taoyuan (TW); Jia-Cheng Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 191 days.

(21) Appl. No.: 17/845,040

(22) Filed: Jun. 21, 2022

(65) Prior Publication Data

US 2023/0288709 A1  Sep. 14, 2023

(30) Foreign Application Priority Data

Mar. 10, 2022  (TW) ................... 111202395

(51) Int. Cl.
*G02B 27/01* (2006.01)
(52) U.S. Cl.
CPC ..... *G02B 27/0176* (2013.01); *G02B 27/0149* (2013.01); *G02B 2027/0154* (2013.01)

(58) Field of Classification Search
CPC ............ G02B 27/0176; G02B 27/0149; G02B 2027/0154
See application file for complete search history.

(56) References Cited

U.S. PATENT DOCUMENTS

2019/0037715 A1\*  1/2019  Chen ..................... H05K 5/0017
2020/0213708 A1\*  7/2020  Wang ................... H04R 1/1066

\* cited by examiner

*Primary Examiner* — Matthew A Eason
*Assistant Examiner* — Chayce R Bibbee
(74) *Attorney, Agent, or Firm* — McClure, Qualey & Rodack, LLP

(57) ABSTRACT

A device for adjusting the degree of tightness is provided. The device is for a first strap element and a second strap element. The device includes an outer adjustment element, an inner adjustment element, and an intermediate adjustment element. The inner adjustment element is disposed inside the outer adjustment element. The intermediate adjustment element is disposed between the inner adjustment element and the outer adjustment element. The first strap element includes a first hollow region, and the second strap element includes a second hollow region. The inner adjustment element passes through the first hollow region and the second hollow region to adjust the degree of overlapping of the first hollow region and the second hollow region.

15 Claims, 8 Drawing Sheets

DEVICE FOR ADJUSTING DEGREE OF TIGHTNESS AND HEAD-MOUNTED DISPLAY INCLUDING THE SAME

CROSS REFERENCE TO RELATED APPLICATIONS

This application claims the benefit of Taiwan Patent Application No. 111202395, filed on Mar. 10, 2022, the entirety of which is incorporated by reference herein.

BACKGROUND OF THE INVENTION

Field of the Invention

The present invention relates to a device for adjusting the degree of tightness.

Description of the Related Art

Nowadays, many apparatuses have strap elements for adjusting the degree of tightness. For example, when a user puts on a head-mounted display (HMD), he usually has to adjust the degree of tightness of the head straps to match his own head size (may also be referred to as head breadth or head width). This is akin to the process whereby, when a user puts on a watch, he usually has to adjust the degree of tightness of the watchstrap to match his wrist size.

One of the common methods for adjusting degree of tightness is to use a knob, and the degree of tightness may be adjusted in a relatively slow manner by rotating the knob. To accelerate the adjustment process, in some apparatuses, there may also be a press button to adjust the degree of tightness. The degree of tightness may be adjusted in a relatively fast manner by pressing the press button to release or tighten the strap elements. However, if the device is equipped with both the knob and the press button, the appearance of the device may be not pleasing, the cost may be increased, and the user may have to check where the knob and the press button are when donning the device, which may affect user experience. Therefore, a more convenient device for adjusting the degree of tightness is needed.

BRIEF SUMMARY OF THE INVENTION

A device for adjusting the degree of tightness is provided in accordance with some embodiments. The device is for a first strap element and a second strap element. The device includes an outer adjustment element, an inner adjustment element, and an intermediate adjustment element. The inner adjustment element is disposed inside the outer adjustment element. The intermediate adjustment element is disposed between the inner adjustment element and the outer adjustment element. The first strap element includes a first hollow region, and the second strap element includes a second hollow region. The inner adjustment element passes through the first hollow region and the second hollow region to adjust the degree of overlapping of the first hollow region and the second hollow region.

In some embodiments, the first hollow region includes a first teeth portion, the second hollow region includes a second teeth portion, the inner adjustment element includes an adjustment teeth portion, and the adjustment teeth portion meshes with both the first teeth portion and the second teeth portion. In some embodiments, the outer adjustment element includes an outer engagement portion, the intermediate adjustment element includes an intermediate engagement portion, and the shape of the outer engagement portion corresponds to the shape of the intermediate engagement portion. In some embodiments, the outer adjustment element and the intermediate adjustment element are able to change to a separation state from an in-contact state.

In some embodiments, the device further includes an elastic element. The elastic element is disposed between the intermediate adjustment element and the inner adjustment element, and the elastic element forces the outer adjustment element and the intermediate adjustment element to change back to the in-contact state from the separation state.

In some embodiments, the device further includes a support element. The support element is in contact with at least one of the first strap element and the second strap element. In some embodiments, the device further includes a securing element. The inner adjustment element is affixed to the support element by the securing element.

In some embodiments, the device further includes a knob. The knob is disposed outside the outer adjustment element. The outer adjustment element includes a plurality of outer positioning portions. The knob includes a button shaft and a plurality of button ribs. The button shaft passes through the outer adjustment element, the intermediate adjustment element, and the inner adjustment element. The button ribs pass through the outer positioning portions.

A head-mounted display is provided in accordance with some embodiments. The head-mounted display includes a display module, a housing, a first head strap, a second head strap, and a device for conducting an adjustment process for adjusting the degree of tightness. The first head strap is connected to the display module and the housing. The second head strap connected to the display module and the housing. The device includes an outer adjustment element, an inner adjustment element, and an intermediate adjustment element. The outer adjustment element is disposed close to an outer surface of the housing. The outer adjustment element includes a plurality of adjustment ratchet portions. The inner adjustment element is disposed inside the outer adjustment element. The intermediate adjustment element is disposed between the inner adjustment element and the outer adjustment element. The housing includes a plurality of housing ratchet portions disposed close to the outer adjustment element, and the housing ratchet portions correspond to the adjustment ratchet portions.

In some embodiments, the adjustment process for adjusting the degree of tightness includes a step adjustment and a non-step adjustment

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" and/or "above" a second feature in the description that follows may include embodiments in which the first and second features are formed in direct contact, and may also include embodiments in which additional features may be formed between the first and second features, so that the first and second features may not be in direct contact. The spatially relative terms are intended to encompass different orientations of the device in use or operation in addition to the orientation depicted in figures. The apparatus may be otherwise oriented (rotated 90 degrees or at other orientations), and the spatially relative descriptors used herein may likewise be interpreted accordingly.

In addition, ordinal terms such as "first", "second", and the like, used in the description and in claims do not by themselves connote any priority, precedence, or order of one element over another, but are used merely as labels to distinguish one element from another element having the same name. Furthermore, in different examples of this disclosure, symbols or alphabets may be used repeatedly.

Figure 1:
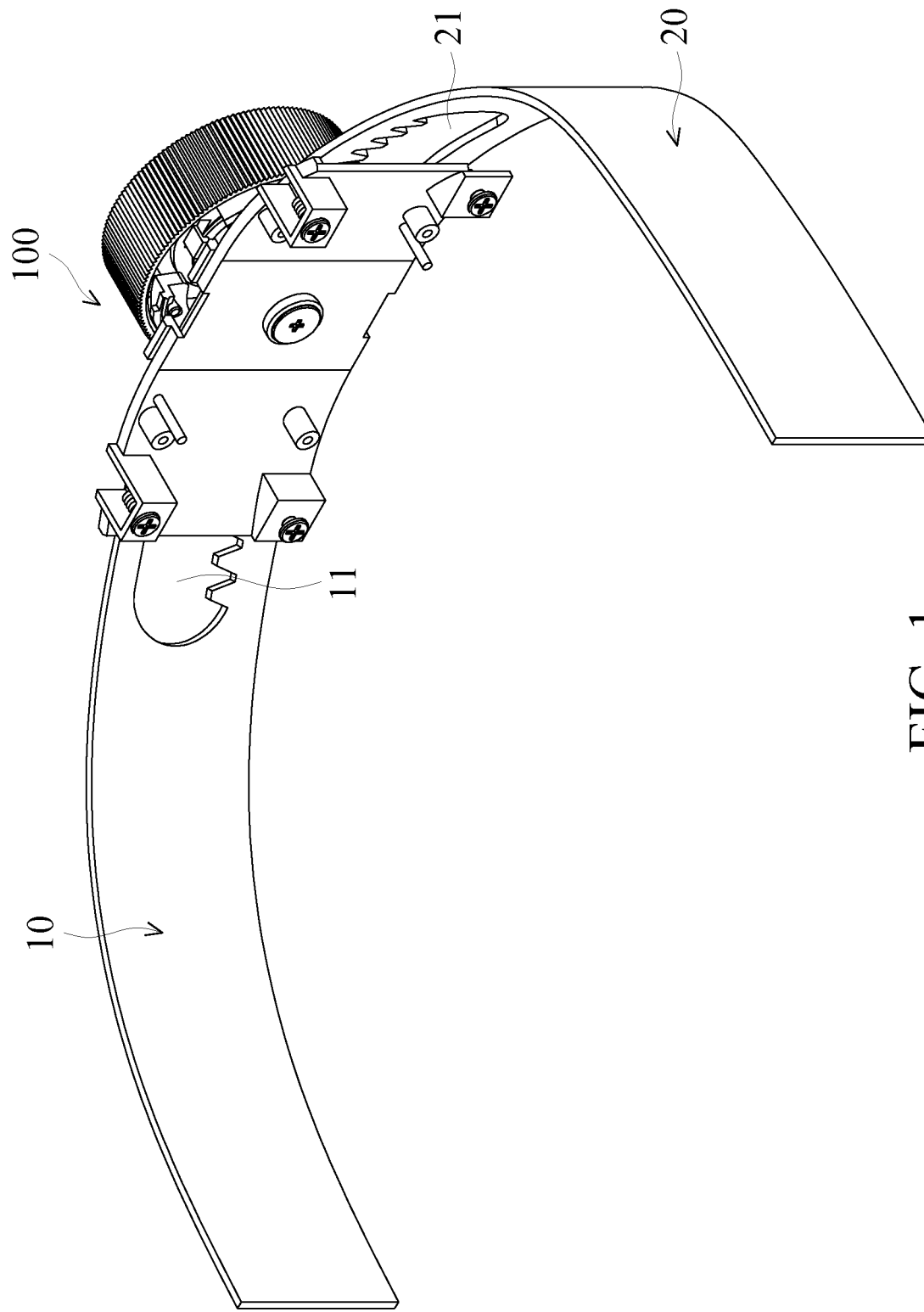
FIG. 1 and FIG. 2 are perspective views of a first strap element, a second strap element, and a device for adjusting the degree of tightness from different perspectives in accordance with some embodiments.
Figure 2:
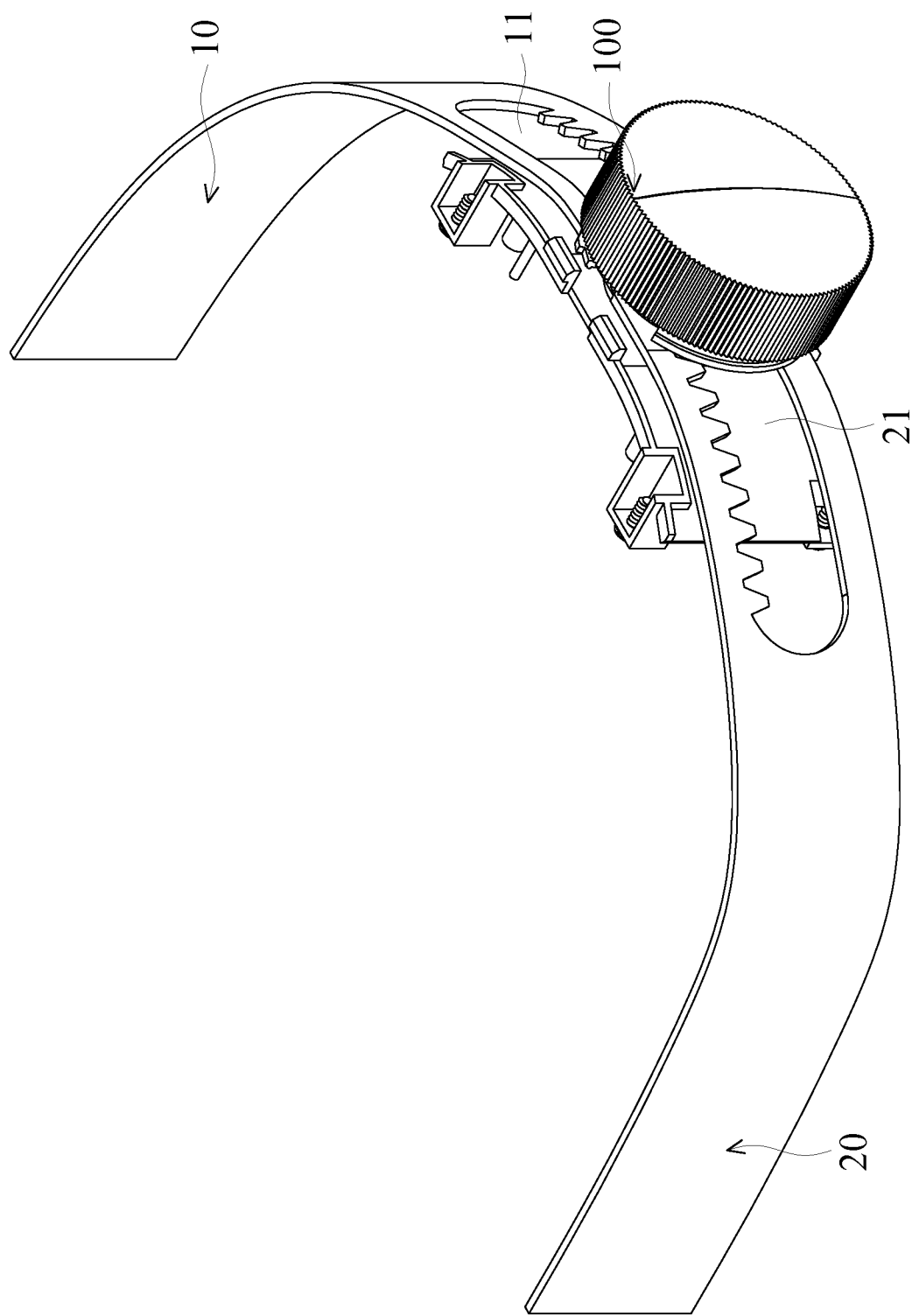

Please refer to FIG. 1 and FIG. 2. FIG. 1 and FIG. 2 are perspective views of a first strap element 10, a second strap element 20, and a device for adjusting the degree of tightness 100 from different perspectives in accordance with some embodiments. In some embodiments, the first strap element 10 and the second strap element 20 may be a head strap, a wrist strap, an abdominal belt, and the like, but it is not limited thereto. In some embodiments, the first strap element 10 and the second strap element 20 may be made of a flexible material, but it is not limited thereto.

For clear illustration, only part of the first strap element 10 and the second strap element 20 is illustrated. In some embodiments, the other end of the first strap element 10 and the other end of the second strap element 20 may be connected to the same element, but are not limited thereto. In some embodiments, the first strap element 10 and the second strap element 20 may be formed as a single ring-shaped strap element, but it is not limited thereto.

The device for adjusting the degree of tightness 100 may adjust the degree of tightness of the first strap element 10 and the second strap element 20. The first strap element 10 includes a first hollow region 11. The second strap element 20 includes a second hollow region 21. When the adjustment process for adjusting the degree of tightness is conducted, the degree of overlapping of the first hollow region 11 and the second hollow region 21 is changed. That is, the positional relationship of the first strap element 10 and the second strap element 20 is changed to be looser or tighter.

Figure 3:
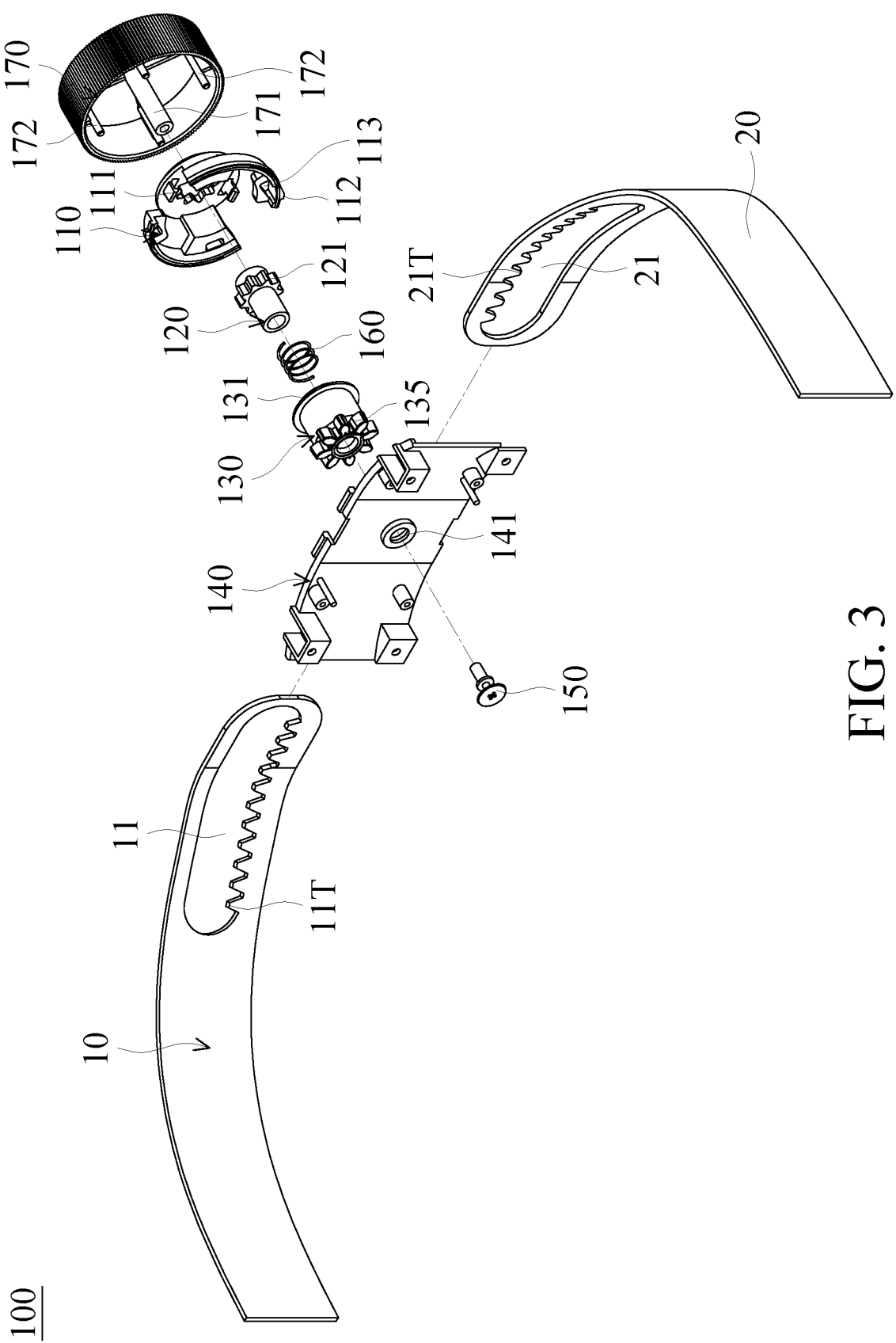
FIG. 3 and FIG. 4 are exploded views of the first strap element, the second strap element, and the device for adjusting the degree of tightness from different perspectives in accordance with some embodiments.
Figure 4:
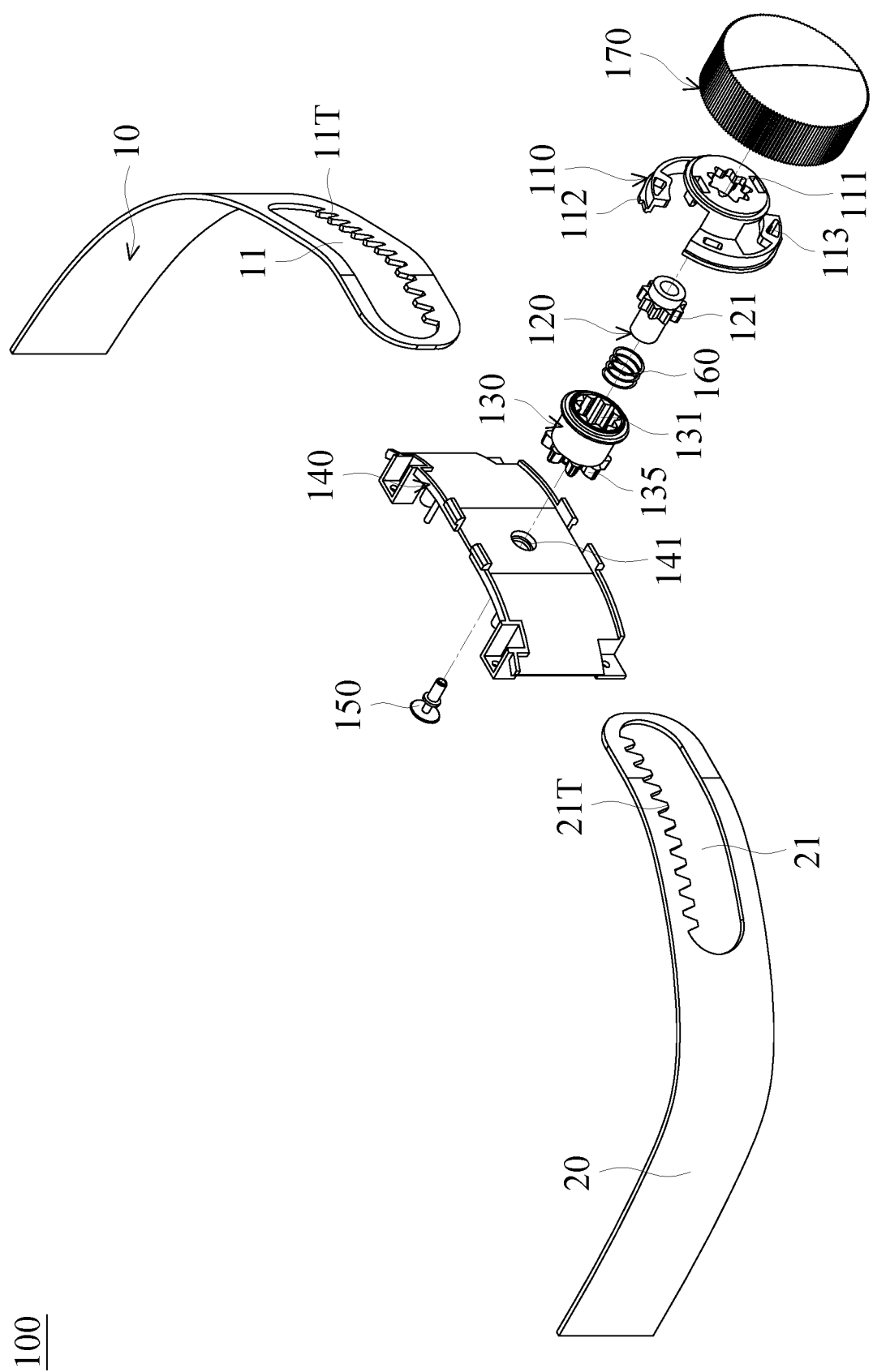

Next, please refer to FIG. 3 and FIG. 4. FIG. 3 and FIG. 4 are exploded views of the first strap element 10, the second strap element 20, and the device for adjusting the degree of tightness 100 from different perspectives in accordance with some embodiments. In this embodiment, the device for adjusting the degree of tightness 100 includes an outer adjustment element 110, an intermediate adjustment element 120, an inner adjustment element 130, a support element 140, a securing element 150, an elastic element 160, and a knob 170. The elements may be added or omitted according to the actual needs.

The outer adjustment element 110 is disposed between the support element 140 and the knob 170. The outer adjustment element 110 may include an outer engagement portion 111, a plurality of adjustment ratchet portions 112, and a plurality of outer positioning portions 113. The intermediate adjustment element 120 is disposed between the inner adjustment element 130 and the outer adjustment element 110. The intermediate adjustment element 120 may include an intermediate engagement portion 121. The inner adjustment element 130 is disposed inside the outer adjustment element 110 and is affixed to the support element 140. The inner adjustment element 130 may include an inner engagement portion 131 and an adjustment teeth portion 135.

The outer adjustment element 110, the intermediate adjustment element 120, and the inner adjustment element 130 may be a transmission element, such as a gear, but are not limited thereto. The outer adjustment element 110, the intermediate adjustment element 120, and the inner adjustment element 130 may rotate together because the outer engagement portion 111, the intermediate engagement portion 121, and the inner engagement portion 131 are engaged each other. In some embodiments, the shape of the outer engagement portion 111 corresponds to the shape of the intermediate engagement portion 121, and the shape of the intermediate engagement portion 121 corresponds to the shape of the inner engagement portion 131, such as polygonal, star-shaped, and the like, but it is not limited thereto.

The inner adjustment element 130 passes through the first hollow region 11 and the second hollow region 21 to conduct the adjustment process for adjusting the degree of tightness of the first strap element 10 and the second strap element 20. In some embodiments, the first hollow region 11 includes a first teeth portion 11T, the second hollow region 21 includes a second teeth portion 21T, and the adjustment teeth portion 135 meshes with both the first teeth portion 11T and the second teeth portion 21T. Clockwise and counterclockwise rotation of the inner adjustment element 130 may occur, so as to change the degree of overlapping of the first hollow region 11 of the first strap element 10 and the second hollow region 21 of the second strap element 20.

In some embodiments, the first teeth portion 11T is formed on the lower side of the first hollow region 11, and the second teeth portion 21T is formed on the upper side of the second hollow region 21. The meshing of the adjustment teeth portion 135 with both the first teeth portion 11T and the second teeth portion 21T is improved by having the first teeth portion 11T and the second teeth portion 21T on different sides.

The support element 140 may be in contact with the first strap element 10, the second strap element 20, or both, so that the adjustment process for the degree of tightness of the first strap element 10 and the second strap element 20 may be stabilized. In addition, the outer adjustment element 110, the intermediate adjustment element 120, and the inner adjustment element 130 may be affixed to each other by the support element 140. The support element 140 may include a securing hole 141. The securing element 150 may pass through the securing hole 141 to affix the inner adjustment element 130 to the support element 140. In some embodiments, the securing element 150 may be a screw, a bolt, or something similar, but it is not limited thereto.

The elastic element 160 is disposed between the intermediate adjustment element 120 and the inner adjustment element 130. The elastic element 160 is made of an elastic element, so the elastic element 160 may provide elastic force in the counter direction. In some embodiments, the elastic element 160 may be a spring, but it is not limited thereto.

The knob 170 is disposed outside the outer adjustment element 110. In some embodiments, to make it easier to turn, the knob 170 is substantially circular, but it is not limited thereto. In some embodiments, to make it easier to press, the main surface of the knob 170 is made of a deformable material, but it is not limited thereto. The knob 170 includes a knob shaft 171 and a plurality of knob ribs 172. The knob shaft 171 passes through the outer adjustment element 110, the intermediate adjustment element 120, and the inner adjustment element 130. The knob ribs 172 pass through the outer positioning portions 113 of the outer adjustment element 110. In this way, a user may apply force on the knob 170, for example, to rotate the knob 170, to drive the outer adjustment element 110.

Figure 5:
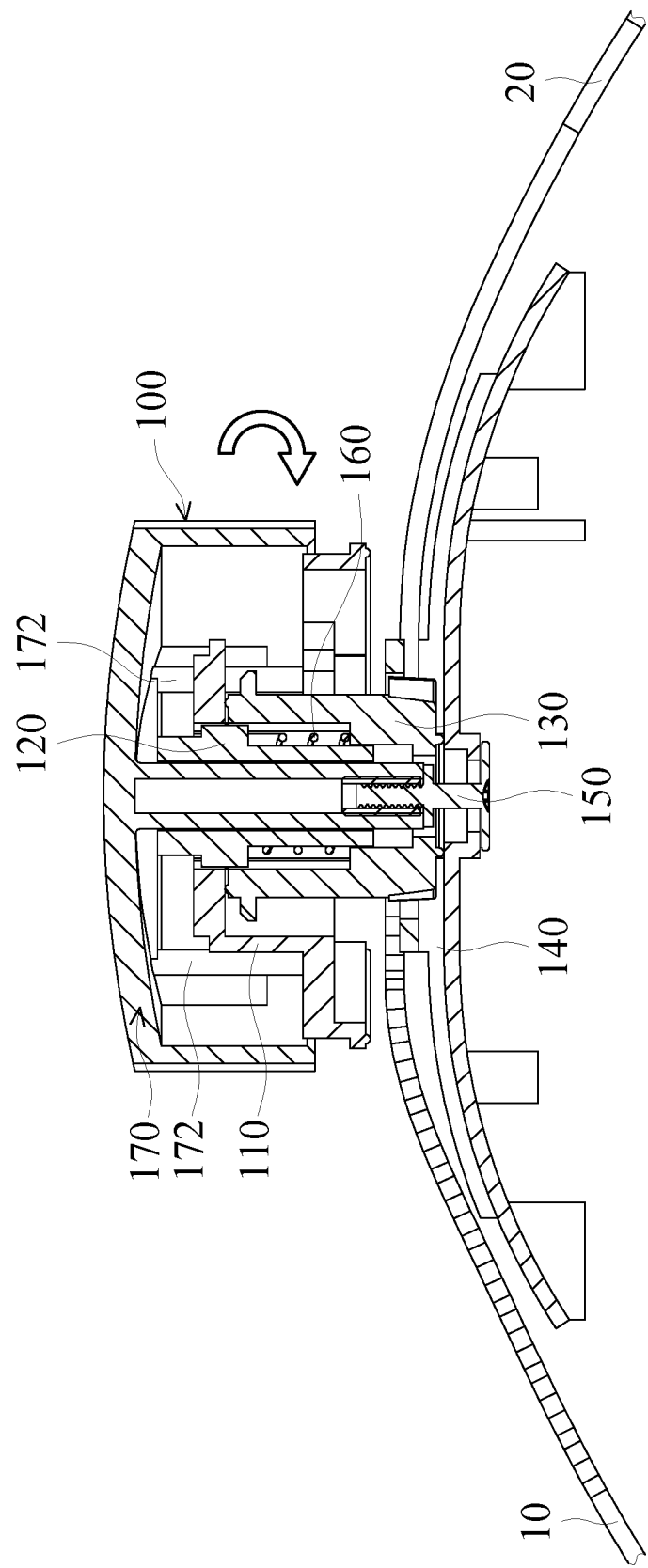
FIG. 5 is a top cross-sectional view of the first strap element, the second strap element, and the device for adjusting the degree of tightness in accordance with some embodiments, wherein an outer adjustment element and an intermediate adjustment element are in an in-contact state.
Figure 6:
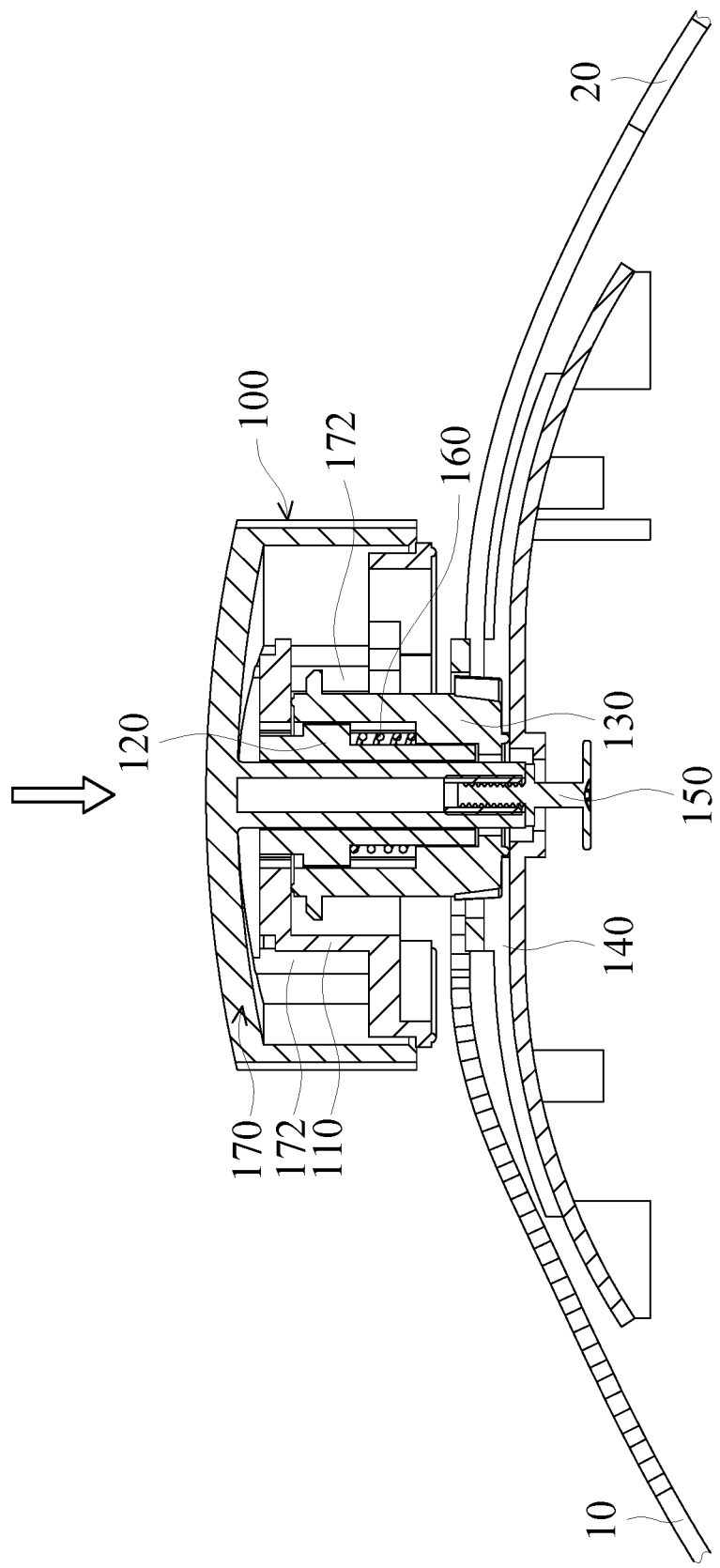
FIG. 6 is a top cross-sectional view of the first strap element, the second strap element, and the device for adjusting the degree of tightness in accordance with some embodiments, wherein the outer adjustment element and the intermediate adjustment element are in a separation state.

Next, please refer to FIG. 5 and FIG. 6. FIG. 5 is a top cross-sectional view of the first strap element 10, the second strap element 20, and the device for adjusting the degree of tightness 100 in accordance with some embodiments, wherein the outer adjustment element 110 and the intermediate adjustment element 120 are in an in-contact state. FIG. 6 is a top cross-sectional view of the first strap element 10, the second strap element 20, and the device for adjusting the degree of tightness 100 in accordance with some embodiments, wherein the outer adjustment element 110 and the intermediate adjustment element 120 are in a separation state. That is, the outer adjustment element 110 and the intermediate adjustment element 120 are able to change from the in-contact state to the separation state. The arrows illustrated in FIG. 5 and FIG. 6 may represent rotating the knob 170 and pressing the knob 170, but the real positions where the force is applied are not limited thereto.

As shown in FIG. 5, when the outer adjustment element 110 and the intermediate adjustment element 120 are in the in-contact state, via the rotation of the knob 170, the contact between the knob ribs 172 and the outer adjustment element 110 may drive the outer adjustment element 110 to rotate. The meshing of the outer adjustment element 110, the intermediate adjustment element 120, and the inner adjustment element 130 may further drive the intermediate adjustment element 120 and the inner adjustment element 130 to rotate. Using the inner adjustment element 130, the degree of overlapping of the first hollow region 11 of the first strap element 10 and the second hollow region 21 of the second strap element 20 may be changed to adjust the degree of tightness of the first strap element 10 and the second strap element 20.

In this embodiment, the clockwise rotation of the knob 170 may increase the degree of overlapping of the first hollow region 11 and the second hollow region 21, so the first strap element 10 and the second strap element 20 are tighter. In addition, the counterclockwise rotation of the knob 170 may decrease the degree of overlapping of the first hollow region 11 and the second hollow region 21 so the first strap element 10 and the second strap element 20 are looser.

As shown in FIG. 6, the knob 170 may be pressed, so the intermediate adjustment element 120 is separated from the outer adjustment element 110. When the outer adjustment element 110 and the intermediate adjustment element 120 are in the separation state, the first strap element 10 and the second strap element 20 may be pulled directly, and the degree of tightness of the first strap element 10 and the second strap element 20 (the degree of overlapping of the first hollow region 11 and the second hollow region 21) may be adjusted in a relatively fast manner. When the user stop pressing the knob 170 (i.e. release the knob 170), the compressed elastic element 160 may provide elastic force in the counter direction to force the outer adjustment element 110 and the intermediate adjustment element 120 change back to the in-contact state from the separation state.

Therefore, the device for adjusting the degree of tightness 100 may conduct both rotation adjustment and pressing adjustment to improve the convenience. In this way, there is no need to set both the knob and the press button, the appearance may be more pleasing, and the manufacturing cost may be reduced. In addition, the user does not have to check where the knob and the press button are, and thus user experience may be improved.

Figure 7:
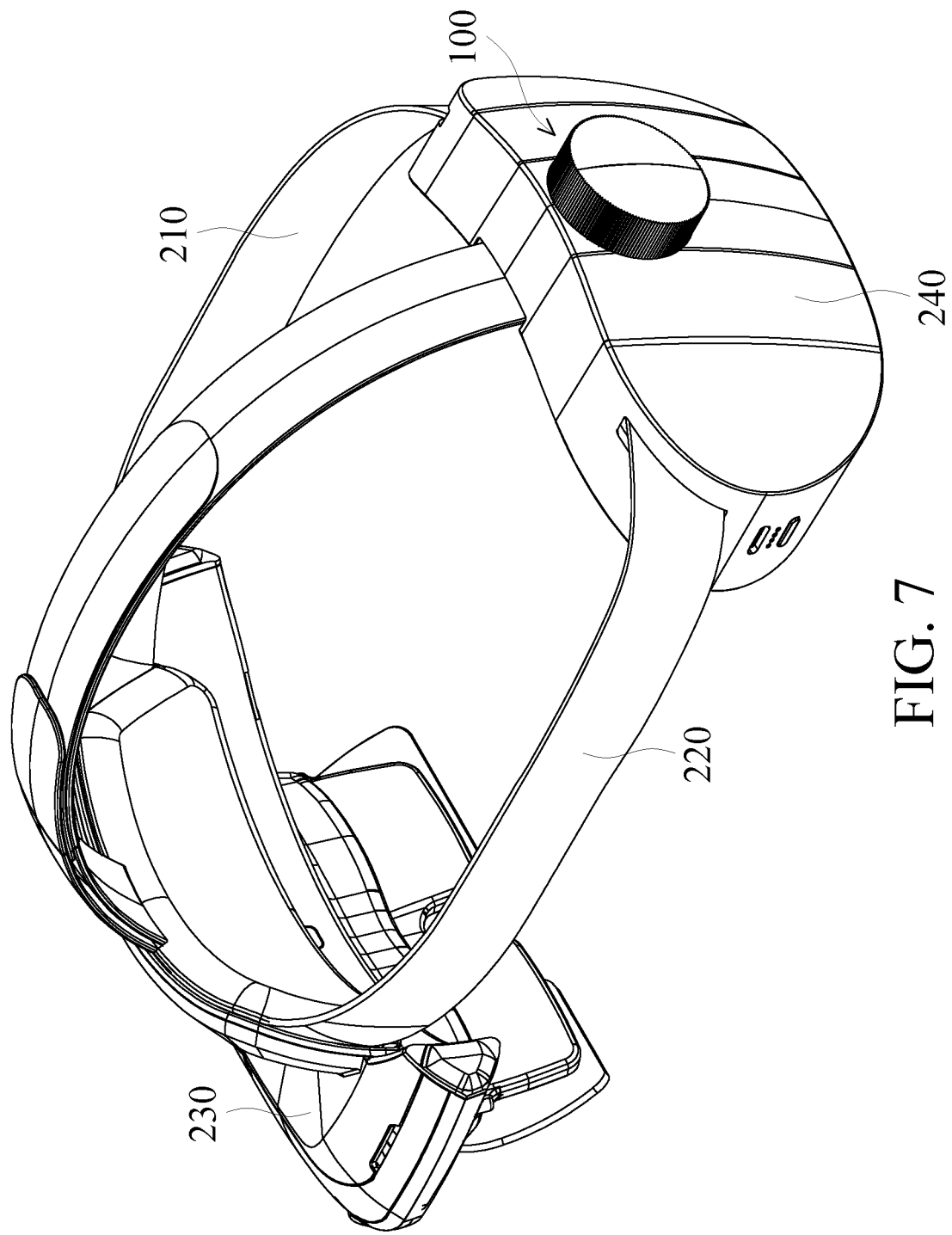
FIG. 7 is a perspective view of a head-mounted display that includes the device for adjusting the degree of tightness in accordance with some embodiments.
Figure 8:
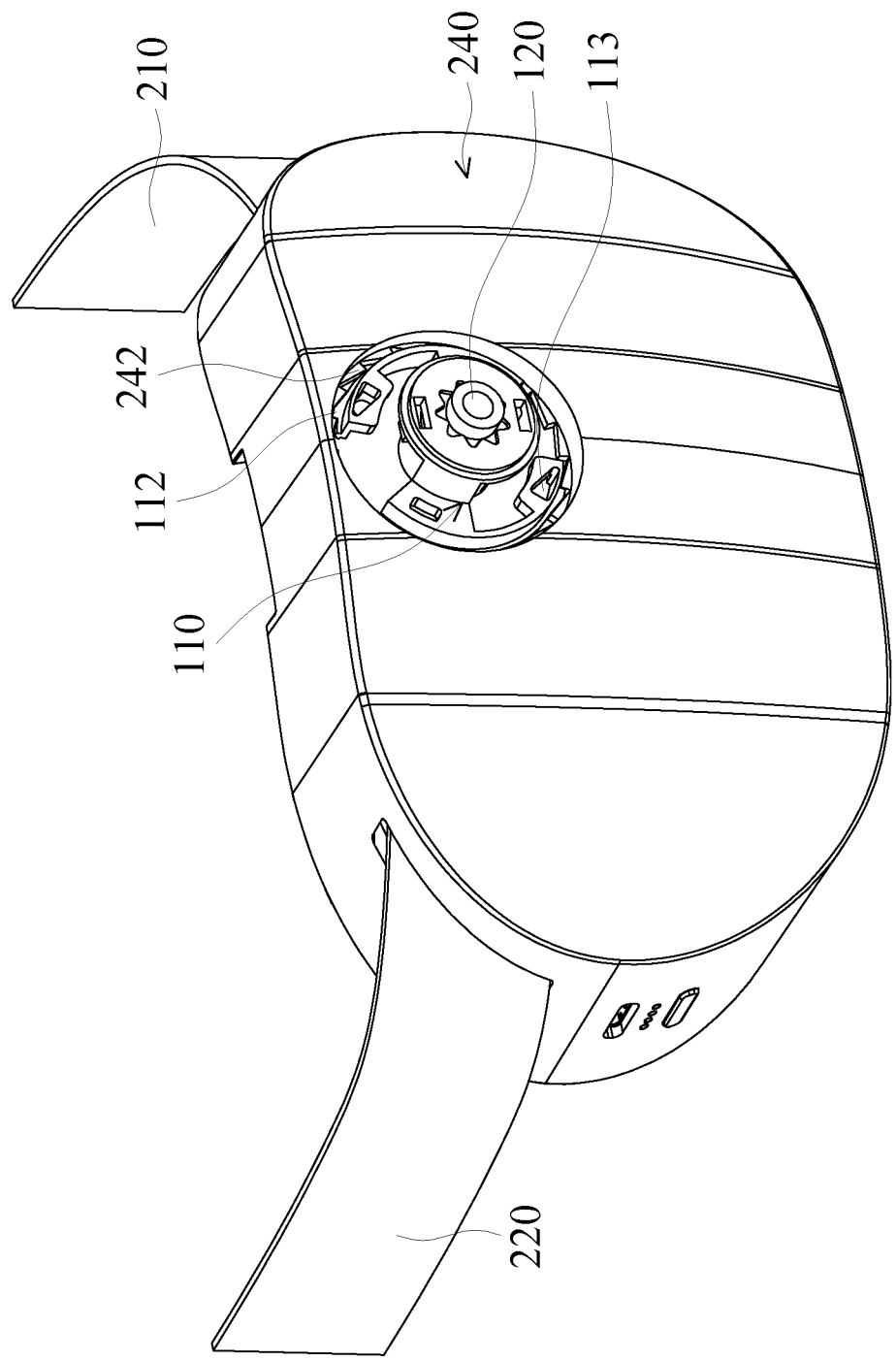
FIG. 8 is an enlarged view of part of the head-mounted display in accordance with some embodiments, wherein a knob is not illustrated.

In the following description, the same or similar elements are denoted by the same or similar symbols. Next, please refer to FIG. 7 and FIG. 8. FIG. 7 is a perspective view of a head-mounted display 200 that includes the device for adjusting the degree of tightness 100 in accordance with some embodiments. FIG. 8 is an enlarged view of part of the head-mounted display 200 in accordance with some embodiments, wherein the knob 170 is not illustrated. The head-mounted display 200 may be associated with virtual reality (VR) techniques, augmented reality (AR) techniques, and the like.

In this embodiment, the head-mounted display 200 includes a first head strap 210, a second head strap 220, a display module 230, and a housing 240. The elements may be added or omitted according to the actual needs. For example, to make the head-mounted display 200 more stable, another head strap may be disposed above the user's head. The first head strap 210 and the second head strap 220 are connected to the display module 230 and the housing 240. The display module 230 may be a liquid crystal display (LCD) module (LCM) or may include an organic light-emitting diode (OLED) panel. The display module 230 is disposed in front of the user's eyes. The display module 230 includes a left-eye display module and a right-eye display module to display a left-eye image and a right-eye image, respectively.

The device for adjusting the degree of tightness 100 is disposed in the housing 240. In some embodiments, the device for adjusting the degree of tightness 100 is disposed right behind the user's head to save the time for checking where the device for adjusting the degree of tightness 100 is, which may be more convenient. The outer adjustment element 110 is disposed close to an outer surface of the housing 240. The housing 240 includes a plurality of housing ratchet portion 242 that is close to the outer adjustment element 110. In some embodiments, the shape of each of the housing ratchet portions 242 corresponds to the shape of each of the adjustment ratchet portions 112, such as triangular, but it is not limited thereto.

When the user rotates the knob 170 of the device for adjusting the degree of tightness 100 to conduct the adjustment process for adjusting the degree of tightness of the first head strap 210 and the second head strap 220 (as shown in FIG. 5), each of the housing ratchet portions 242 may stop the rotation of the outer adjustment element 110 and prevent shaking, displacement, and the like of the outer adjustment element 110. In addition, when the housing ratchet portions 242 stops the rotation of the outer adjustment element 110 via the adjustment ratchet portions 112, there may be a sound, such as a click sound, so the user is able to know how the degree of tightness is adjusted and know the adjustment includes different sections. Therefore, the rotation of the device for adjusting the degree of tightness 100 may be referred to as a step adjustment.

Comparatively, when the user presses the device for adjusting the degree of tightness 100 to conduct the adjustment process for adjusting the degree of tightness of the first head strap 210 and the second head strap 220 (as shown in FIG. 6), the user is able adjust the degree of tightness by directly pulling the first head strap 210 and the second head strap 220. Therefore, the pressing of the device for adjusting the degree of tightness 100 may be referred to as a non-step adjustment, and the non-step adjustment may be conducted in a relatively fast manner.

When the user puts on the head-mounted display 200, the user is able to choose whether to use the step adjustment or the non-step adjustment. In some embodiments, the degree of adjustment of the step adjustment is relatively small, so the step adjustment is more accurate, but it is not limited thereto. In some embodiments, the degree of adjustment of the non-step adjustment is relatively large, so the non-step adjustment is faster, but it is not limited thereto. The combination of the step adjustment with the non-step adjustment gives the user options in terms of the speed and accuracy of adjustment, improving overall user experience.

For example, before the user puts on the head-mounted display 200, the user may first press the knob 170 to rapidly release or loosen the first head strap 210 and the second head strap 220 via the non-step adjustment. Next, after the head-mounted display 200 is securely fitted to the user, the user may press the knob 170 again to tighten the first head strap 210 and the second head strap 220, and to make the degree of tightness substantially match his head size using the non-step adjustment. After stop pressing the knob 170 (i.e. releasing the knob 170), the user may rotate the knob 170 to make the degree of tightness of the first head strap 210 and the second head strap 220 further match his head breadth via the step adjustment. It should be noted that these steps are merely examples, and a user may add or omit steps related to the step adjustment and the non-step adjustment.

Based on the present disclosure, the device for adjusting the degree of tightness 100 may conduct both rotation adjustment and pressing adjustment to improve convenience. In this way, there is no need to set both the knob and the press button, the appearance may be more pleasing, and the manufacturing cost may be reduced. In addition, the user does not have to check where the knob and the press button are, which will improve user experience. Furthermore, when a device for adjusting the degree of tightness is applied to an apparatus, the apparatus may include stop portions to stop the rotation, so the user is able to know how to adjust the degree of tightness and to know that the adjustment includes different sections. The user is able to choose whether to use the step adjustment or the non-step adjustment. The combination of the step adjustment and the non-step adjustment gives the user options in terms of the speed and accuracy of the adjustment, improving user experience.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A device for adjusting degree of tightness and for a first strap element and a second strap element, comprising:
    an outer adjustment element;
    an inner adjustment element disposed inside the outer adjustment element;
    an intermediate adjustment element disposed between the inner adjustment element and the outer adjustment element;
    a support element in contact with at least one of the first strap element and the second strap element; and
    a securing element, wherein the inner adjustment element is affixed to the support element by the securing element;
    wherein the first strap element comprises a first hollow region, the second strap element comprises a second hollow region, the inner adjustment element passes through the first hollow region and the second hollow region to adjust degree of overlapping of the first hollow region and the second hollow region;
    wherein the outer adjustment element and the intermediate adjustment element are able to change to a separation state from an in-contact state, and a positional relationship between the support element and the securing element is changed correspondingly.

2. The device as claimed in claim 1, wherein the first hollow region comprises a first teeth portion, the second hollow region comprises a second teeth portion, the inner adjustment element comprises an adjustment teeth portion, and the adjustment teeth portion meshes with both the first teeth portion and the second teeth portion.

3. The device as claimed in claim 1, wherein the outer adjustment element comprises an outer engagement portion, the intermediate adjustment element comprises an intermediate engagement portion, and a shape of the outer engagement portion corresponds to a shape of the intermediate engagement portion.

4. The device as claimed in claim 1, further comprising an elastic element, wherein the elastic element is disposed between the intermediate adjustment element and the inner adjustment element, and the elastic element forces the outer adjustment element and the intermediate adjustment element to change back to the in-contact state from the separation state.

5. The device as claimed in claim 1, further comprising a knob, wherein the knob is disposed outside the outer adjustment element, the outer adjustment element comprises a plurality of outer positioning portions, the knob comprises a button shaft and a plurality of button ribs, the button shaft passes through the outer adjustment element, the intermediate adjustment element, and the inner adjustment element, and the button ribs pass through the outer positioning portions.

6. A head-mounted display, comprising:
a display module;
a housing;
a first head strap connected to the display module and the housing;
a second head strap connected to the display module and the housing; and
a device for conducting an adjustment process for adjusting degree of tightness of the first head strap and the second head strap, wherein the device comprises:
an outer adjustment element disposed close to an outer surface of the housing and comprising a plurality of adjustment ratchet portions;
an inner adjustment element disposed inside the outer adjustment element;
an intermediate adjustment element disposed between the inner adjustment element and the outer adjustment element;
a support element in contact with at least one of the first head strap and the second head strap; and
a securing element, wherein the inner adjustment element is affixed to the support element by the securing element;
wherein the housing comprises a plurality of housing ratchet portions disposed close to the outer adjustment element, and the housing ratchet portions correspond to the adjustment ratchet portions;
wherein the outer adjustment element and the intermediate adjustment element are able to change to a separation state from an in-contact state, and a positional relationship between the support element and the securing element is changed correspondingly.

7. The head-mounted display as claimed in claim 6, wherein the adjustment process for adjusting the degree of tightness comprises a step adjustment and a non-step adjustment.

8. The head-mounted display as claimed in claim 6, wherein each of the housing ratchet portions and the adjustment ratchet portions is triangular.

9. The head-mounted display as claimed in claim 6, wherein the first head strap comprises a first hollow region, the second head strap comprises a second hollow region, and the inner adjustment element passes through the first hollow region and the second hollow region.

10. The head-mounted display as claimed in claim 9, wherein the adjustment process for adjusting the degree of tightness adjusts degree of overlapping of the first hollow region and the second hollow region.

11. The head-mounted display as claimed in claim 10, wherein the first hollow region comprises a first teeth portion, the second hollow region comprises a second teeth portion, the inner adjustment element comprises an adjustment teeth portion, and the adjustment teeth portion meshes with both the first teeth portion and the second teeth portion.

12. The head-mounted display as claimed in claim 6, wherein the outer adjustment element comprises an outer engagement portion, the intermediate adjustment element comprises an intermediate engagement portion, and a shape of the outer engagement portion corresponds to a shape of the intermediate engagement portion.

13. The head-mounted display as claimed in claim 6, further comprising an elastic element, wherein the elastic element is disposed between the intermediate adjustment element and the inner adjustment element.

14. The head-mounted display as claimed in claim 6, further comprising a knob, wherein the knob is disposed outside the outer adjustment element, and the knob is larger than the outer adjustment element.

15. The head-mounted display as claimed in claim 14, wherein the outer adjustment element comprises a plurality of outer positioning portions, the knob comprises a button shaft and a plurality of button ribs, the button shaft passes through the outer adjustment element, the intermediate adjustment element, and the inner adjustment element, and the button ribs pass through the outer positioning portions.

* * * * *